United States Patent [19]

Torre

[11] 4,451,191
[45] May 29, 1984

[54] STACKED FABRIC REMOVAL AND RE-LOCATING DEVICE

[75] Inventor: Giancarlo D. Torre, Biassono, Italy

[73] Assignee: Rockwell-Rimoldi S.p.A., Milan, Italy

[21] Appl. No.: 373,547

[22] Filed: Apr. 30, 1982

[30] Foreign Application Priority Data

Jun. 23, 1981 [IT] Italy ............................... 22517 A/81

[51] Int. Cl.³ ............................................. B65H 1/14
[52] U.S. Cl. ......................................... 414/118; 74/89;
221/11; 221/279; 271/9; 271/147; 271/154;
271/157; 414/47; 414/120
[58] Field of Search ...................... 414/47, 71, 72, 117,
414/118, 120, 121, 744 A, 744 B; 221/11, 104,
105, 121, 279; 271/9, 107, 147, 152, 154, 155,
157; 74/25, 89

[56] References Cited

U.S. PATENT DOCUMENTS

| | | | |
|---|---|---|---|
| 2,152,518 | 3/1939 | Wolff | 74/89 X |
| 2,639,150 | 5/1953 | Aberle | 271/155 |
| 3,406,837 | 10/1968 | Kirsch et al. | 414/744 B X |
| 3,409,151 | 11/1968 | Ottaway et al. | 414/118 |
| 3,722,741 | 3/1973 | Mojden | 221/11 |
| 3,749,395 | 7/1973 | Bazzarone et al. | 271/4 |
| 3,857,496 | 12/1974 | Gonzales | 414/744 B X |
| 3,938,697 | 2/1976 | Kinney | 221/11 |
| 3,981,495 | 9/1976 | Bijttebier | 271/18.3 |
| 4,024,963 | 5/1977 | Hautau | 414/121 X |
| 4,195,961 | 4/1980 | Waiblinger | 414/120 |

FOREIGN PATENT DOCUMENTS

54-43267 4/1977 Japan ..................................... 414/71

Primary Examiner—Leslie J. Paperner

[57] ABSTRACT

A device for removing and relocating pieces of fabric from a stack having a carousel that carries a plurality of stack support plates disposed about the axis of rotation of the carousel.

When one supportplate is depleted of its pieces forming a stack, a bar for elevating the supportplate to piece removal position is caused to be lowered to a position which permits the carousel to be rotated and to selectively present a supportplate having a full stack thereon in a location whereat it is elevated to piece removing position and the device resumes its function of separate and sequential removal and relocating of each piece from the stack.

1 Claim, 5 Drawing Figures

Fig_1

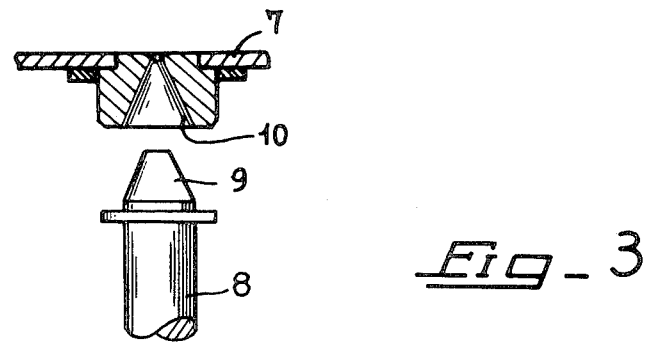
_Fig_3
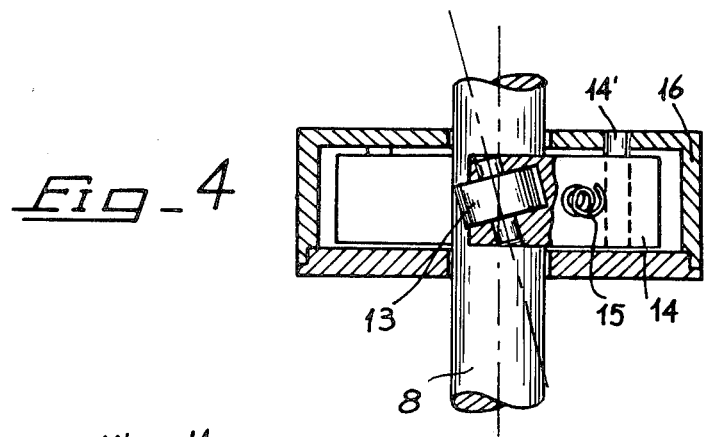
_Fig_4
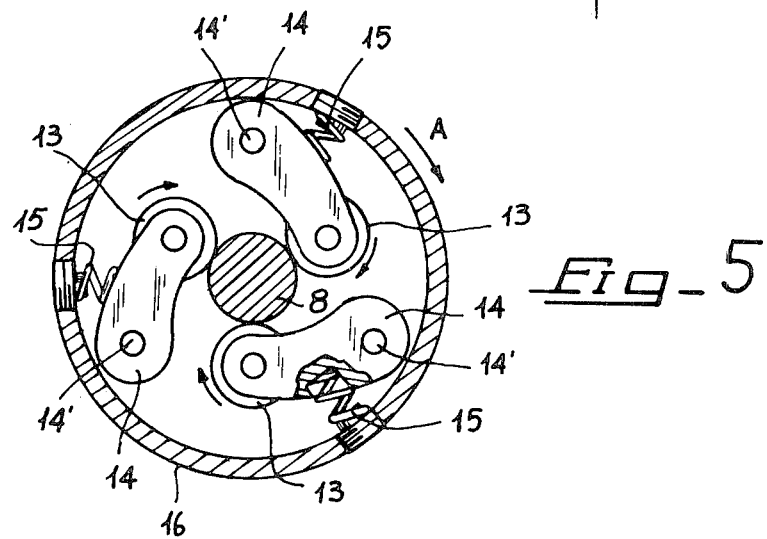
_Fig_5

STACKED FABRIC REMOVAL AND RE-LOCATING DEVICE

BACKGROUND OF THE INVENTION

The present invention pertains to an improved apparatus for removing fabric pieces from a stack and then without intervention on the part of an operator, place the removed piece onto a transport device that is effective in advancing said piece to a position for receiving additional manufacturing operations such as stitching it or assembling it to another piece.

Devices for removing a piece of fabric from a stack and then relocating the piece for receiving further manufacturing operations are well known; however, such devices do not possess all the elements which would make it completely automatic especially upon the depletion of one stack and then locating another stack in operative association with the means for effecting separate and individual removal of each piece.

The apparatus according to the invention is capable of successively and accurately locating stacks of fabric pieces for independent removal of each piece and the only manual operation required is that of re-loading the stack support members each time a stack is depleted.

SUMMARY OF THE INVENTION

The present invention includes a pick-up member which is alternately raised from and thence lowered into engagement with the upper piece on the stack of pieces disposed in vertical alignment therewith. During the raising of the pick-up member, the upper piece is removed from the stack and simultaneously the pick-up member is rotated so that the removed piece will be relocated when released. After the pick-up member releases the fabric piece the cycle is repeated and by a sensing means operatively associated with the stack's upper surface, the stack is automatically raised after the removal of each piece so that it is always at the same level to receive the pick-up member when it is lowered for contact therewith.

It is a general object of the invention to provide an improved device for independently removing and relocating pieces of fabric from a stack. A further object is to provide an improved device that is capable of accommodating a plurality of stacks of fabric pieces.

A more specific object is to provide an improved device that will automatically and accurately present a new stack of fabric pieces to the pick-up member upon depletion of the pieces from a stack.

These and other objects of the present invention will become more fully apparent by reference to the appended claims and as the following detailed description proceeds in reference to the figures of drawing wherein:

BRIEF DESCRIPTION OF THE DRAWINGS

FIG. 3 is an enlarged view and partially in section of the means for supporting a stack carrier shown in FIG. 2; and FIGS. 4 and 5 are sectional views taken along lines IV—IV and VV in FIG. 4 respectively.

DESCRIPTION OF THE PREFERRED EMBODIMENT

Figure 1:
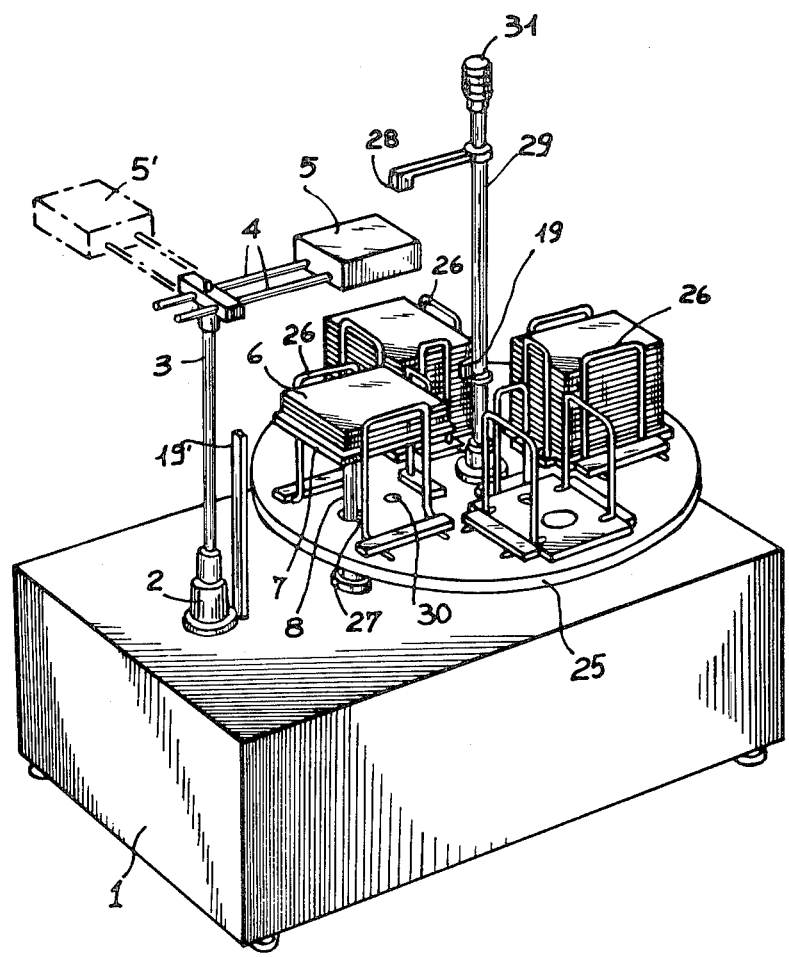
FIG. 1 is a perspective view of the improved apparatus according to the invention.
Figure 2:
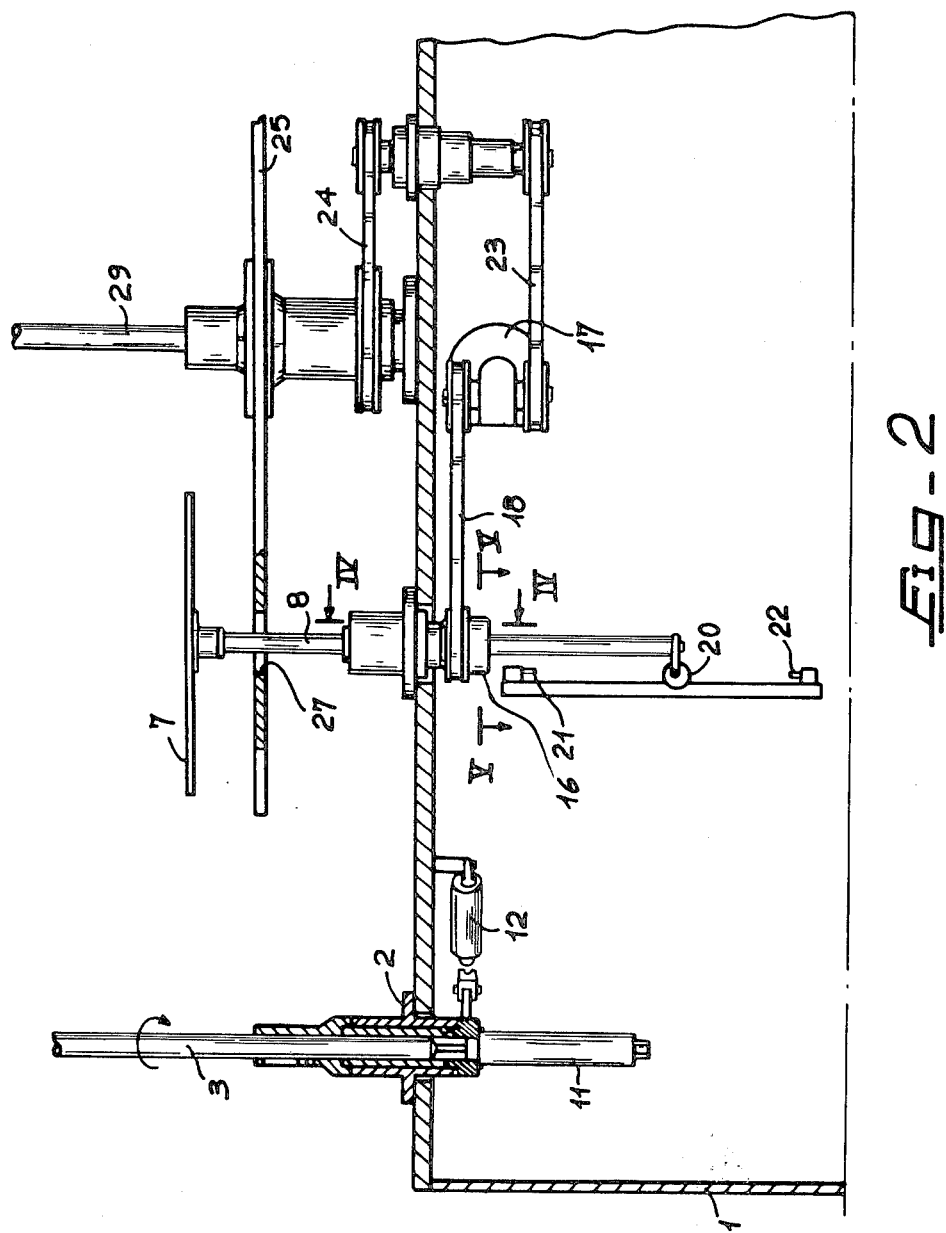
FIG. 2 is a sectional view of a portion of the apparatus shown in FIG. 1.

Referring now to FIGS. 1 and 2, the device according to the invention is provided with a supporting frame 1 having a vertically extending support housing 2 mounted on the upper surface thereof with one end of a vertically extending rod 3 mounted in said support housing 2. The upper end of the rod 2 is operatively connected to a pair of spaced horizontal rods 4 with the ends most remote from said rod 3 being connected to a pick-up member 5. When the pick-up member 5 is in the solid line position shown in FIG. 1 it can be lowered by the rod 3 into contact with the upper surface of a stack that is formed by a plurality of superposed pieces of fabric 6. Each stack of pieces is carried on a stack support plate 7 which is operatively connected to a rod 8 having one end 9 of conical configuration which is adopted to be received into a seat 10 of conforming configuration provided on the underside of said support plate 7.

As shown in FIG. 2, the lower end of the rod 8 is operatively connected to an actuating means which causes it to be raised and lowered as required so that the pick-up member 5 will always be lowered a distance which is slightly more than the distance which separates it from the upper surface of a stack formed by the pieces of fabric 6. The lowering of the pick-up member in this manner provides effective engagement of the latter with the upper surface of a stack and positive withdrawal of the upper piece when the pick-up member is raised and rotated to the phantom line position shown in FIG. 1.

The rod 3 is raised and lowered by means of a pneumatic cylinder 11 and to rotate said rod 3 so as to position the pick-up member in the phantom line position depicted by numeral 5' in FIG. 1, a pneumatic cylinder 12 is operatively connected thereto as shown in FIG. 2.

When the pick-up member is in its phantom line position it is caused to release the piece of fabric removed from the stack. The released piece of fabric by means not shown is caused to be advanced to a position for receiving additional operations such as stitching or its attachment to another piece of fabric.

As shown in FIGS. 4 and 5, the rod 8 is operatively associated with rollers 13 in a manner whereby the axes thereof are inclined relative to the axis of said rod 8. These rollers 13 may be cylindrical or they may be provided with concave or convex surfaces that will facilitate their engagement with the peripheral surface of the rod 8.

Referring again to FIGS. 4 and 5, the rollers 13 are rotatably supported on arcuated levers 14 that are pivotably mounted on pin members 14'. These levers are continually urged, by individual springs 15, in a direction to cause rollers 13 to engage the rod 8. As shown in FIG. 5 one end of this springs 15 is assembled within a seat provided intermediate the ends of a lever 14 and the opposite end is in engagement with a threaded seat assembled in the peripheral wall of a housing 16. With reference to FIG. 2, housing 16 is capable of being rotated by means of an electric motor 17 and an endless drive belt 18.

The pin members 14' are fixed within the housing 16 and when the pick-up member 5 is lowered onto the stack of fabric pieces 6, by an amount slightly greater than the distance which separates it from the upper surface of the stack, the pressure exerted by said pick-up member is elastically opposed by the rollers 13 so that when the housing 16 is caused to rotate in the direction of the indicating arrow A (FIG. 5) the rod 8 is caused to be raised. Rod 8 continues to rise until the upper surface of a stack interferes with a light beam operatively associated with a first sensing device including a photo-electric cell 19 and is effective in interrupting the circuitry to the motor 17 which in turn discontinues the raising of said rod 8.

After the pick-up member 5 has been raised and rotated to the phantom line position in FIG. 1, it is cause to return to the solid line position and thence lowered an amount which causes a temporary lowering of the stack and the subsequent raising thereof so that the desired level of the upper surface of the stack is restored. This is accomplished by the rollers 13 described supra which cause the rod 8 to be raised and to stop only when the upper portion of the stack interferes with the beam of reflected light.

To maintain the desired level of the stack's upper surface, the rod 8 is raised a slightly greater distance after each piece removing cycle until it reaches its upper-most position upon removal of the last piece of fabric 6 of a stack by the pick-up member 5.

When the rod 8 reaches its uppermost position, a roller 20, attached to the lower end thereof, makes contact with a micro switch 21 (FIG. 2) which is effective in causing the electric motor 7 to rotate in the opposite direction so as to effect the lowering of said rod 8. Rod 8 continues to move downwardly until it makes contact with a micro switch 22 which then causes the motor 17 to rotate in the direction which is effective in causing the housing 16 to rotate in the direction of the indicating arrow A in FIG. 5. Rotation of the housing 16 in this manner initiates the raising of the rod 8 and simultaneously a clutch is activated which interconnects the motor 17 with a drive means that includes endless belts 23 and 24 that are operatively connected to pulleys which effect rotation of a plate member 25 that carries a plurality of stack support plates 7.

In FIG. 1 the apparatus is shown as having four stack support plates 7 each of which is provided with three upwardly directed U-shaped guide rods 26 which are adapted to maintain the stacks of fabric pieces 6 in alignment on their respective support plate 7.

When the plate member 25 is caused to rotate to position a stack of pieces in vertical alignment with the pick-up member 5, it is necessary that the upper end of the rod 8 be located below the plate member 25. When the plate member stops in an operating position, the rod 8 is raised by rollers 13 so as to pass through an opening 27 in said plate member. After passing through this opening 27, the rod 8 engages the underside of the selected plate member 25 so as to raise the same and the stack of fabric pieces 6 located thereon. The plate member 25 continues to rise until the light beam from the photo-electric cell 19 is interrupted by the upper portion of the stack. During rotation of the plate member 25, a light beam from a second sensing device defining an elevated photo-electric cell 28 mounted on a fixed rod 29 is brought into vertical alignment with a reflector 30 assembled on said plate member 25 directly below an opening 30' provided in each stack support plate 7. Should an empty stack support plate 7 be brought into alignment with the pick-up member 5 the light beam would pass through the opening 30' to the reflector 30 which would cause continued rotation of the plate member 25 until a support plate 7 with a stack of fabric pieces 6 is brough into alignment with said pick-up member 5 so as interrupt the beam of light. The arrival of a stack of fabric pieces in alignment with the pick-up member 5 deenergizes the photo-electric cell 28 causing a cessation of the motor 17 as well as the rotation of the plate member 25.

A tell-tale lamp 31 including a separate indicating element for each stack support plate 7 is disposed above the fixed rod 29. This lamp is arranged so that the element corresponding to an empty support plate is lit thus indicating to an operator that replenishment is necessary.

As conventional circuitry is utilized for actuating the various electrically controlled elements described herein, it is not considered necessary to show and describe such circuitry.

The rollers 13 for effecting the raising and lowering of the rod 8 may be substituted by other means, such as a pneumatic cylinder which would also be capable of elastically opposing the pressure exerted by the pick-up member 5 on the stack of fabric pieces 6.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A device for removing and relocating pieces of flexible material from a stack comprising:
   (a) a supporting frame (1);
   (b) a plate member (25) mounted for rotatable indexing movement on said supporting frame;
   (c) a plurality of support plates (7) having seats (10) on the underside thereof mounted for rotation in said plate member (25) to support stacks of flexible material;
   (d) a vertically linearly movable rod (8) having the upper end thereof configured to mate with said seats (10) to move plate (7) from a lower position adjacent said plate member (25) to an upper position where removal of flexible material can be effected;
   (e) upper and lower limit switches (21, 22) mounted on said frame (1) to control the maximum extent of vertical movement of said rod (8);
   (f) horizontally directed photo-electric sensing means (19) mounted on said frame (1) to provide for vertical adjustment of said rod (8) as flexible pieces are removed from said plate (7);
   (g) vertically directed photo-electric sensing means (28) mounted on said frame (1) for determining when all flexible pieces have been removed from said plate (7) so that said rod (8) will move to its lowermost position and said plate member (25) will rotate to bring a new plate (7) with flexible pieces into unloading position;
   (h) a pick-up member (5) mounted on said supporting frame (1) and movable to a position overlying said plate (7);
   (i) means for displacing said pick-up member (5) toward a stack of flexible pieces on said plate (7), a distance which is slightly greater than the distance which separates it from the upper surface of the stack; and
   (j) means for displacing said pick-up member (5) in its raised position for releasing and relocating the flexible piece of material removed from the stack.

* * * * *